C. O. WOOD.
FRICTION CLUTCH.
APPLICATION FILED DEC. 17, 1917.
1,282,666.
Patented Oct. 22, 1918.
3 SHEETS—SHEET 3.
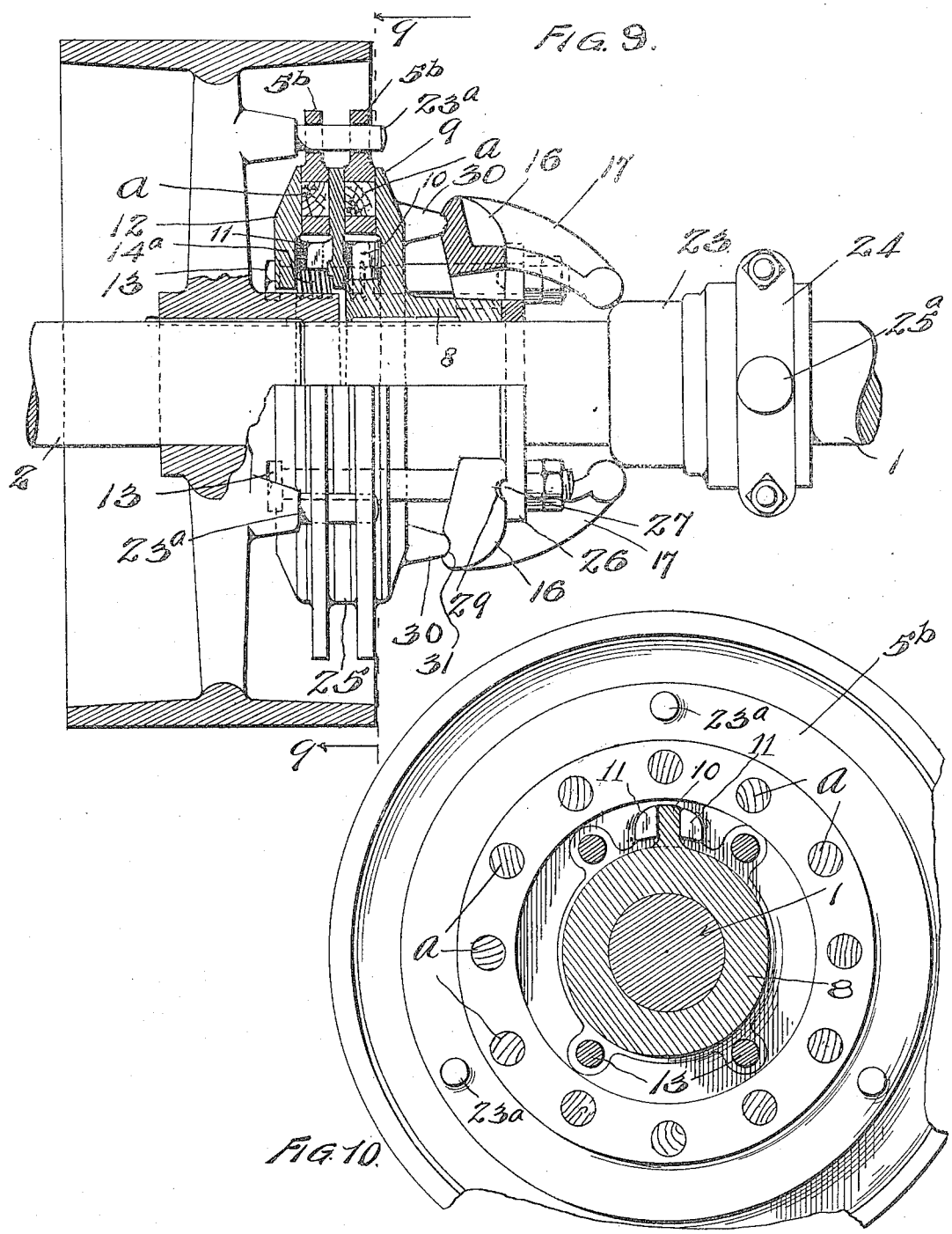
INVENTOR
Charles O. Wood
Henry Orth Jr
ATTORNEY

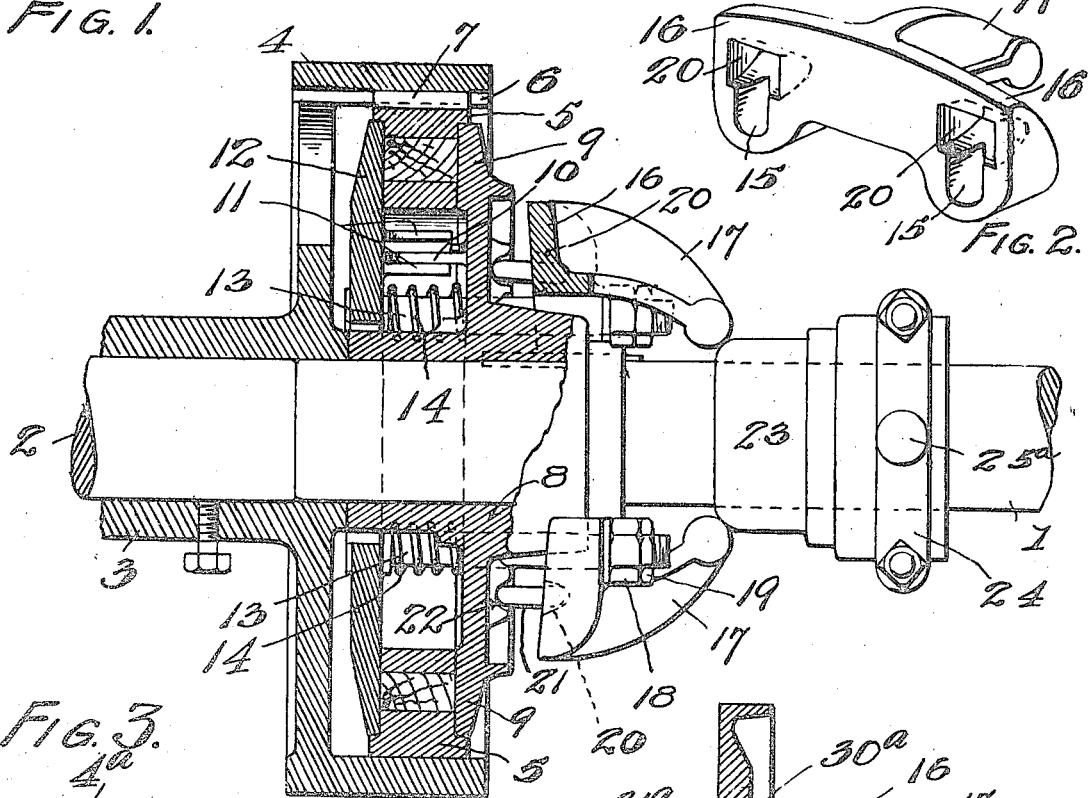
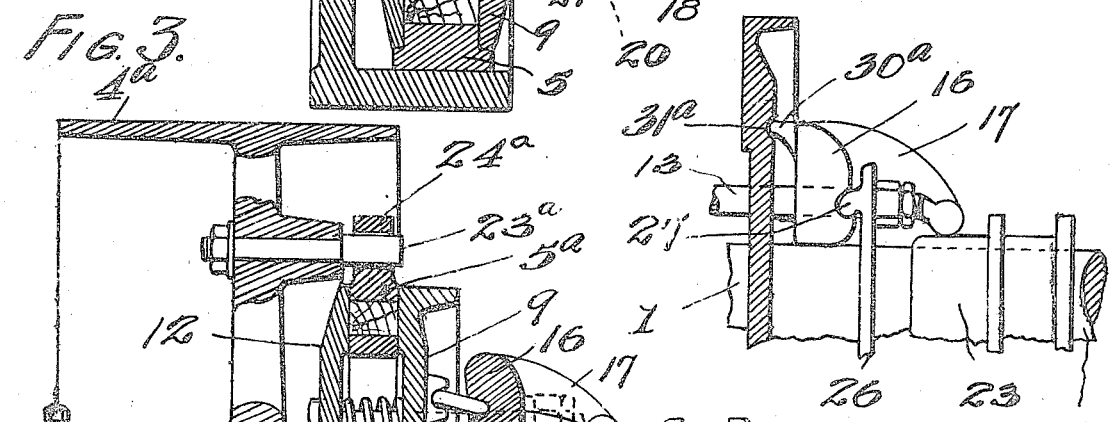
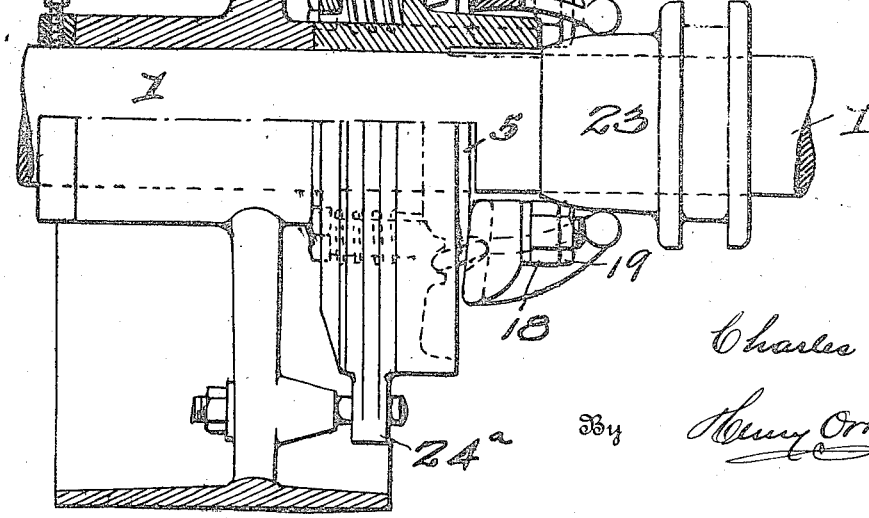

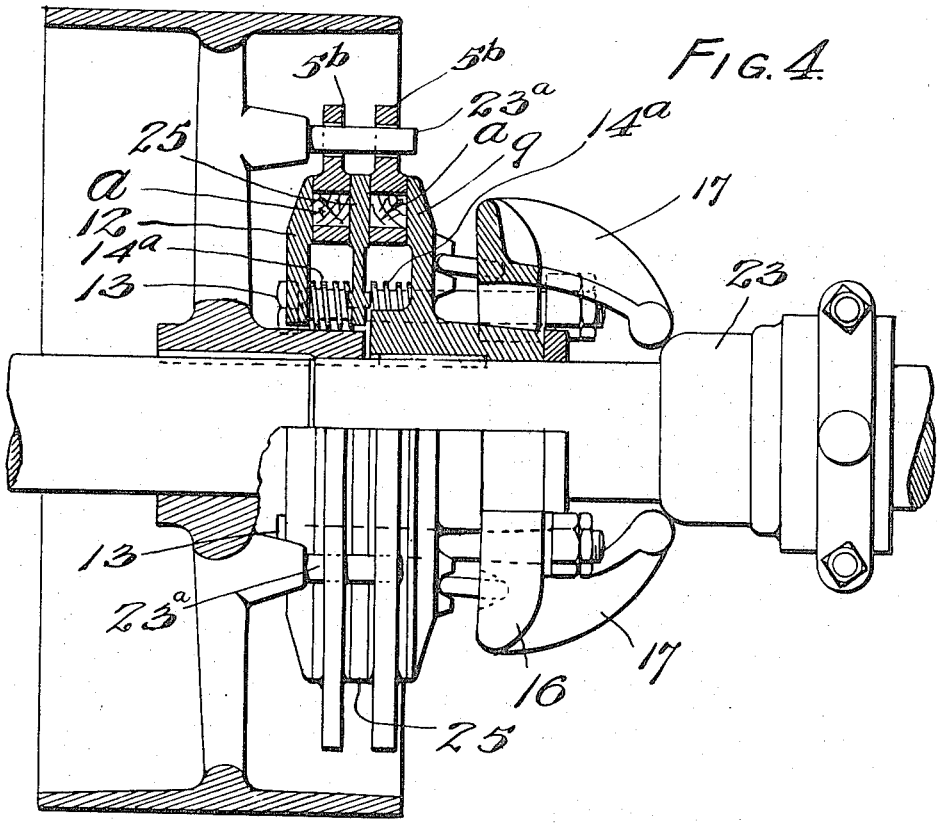
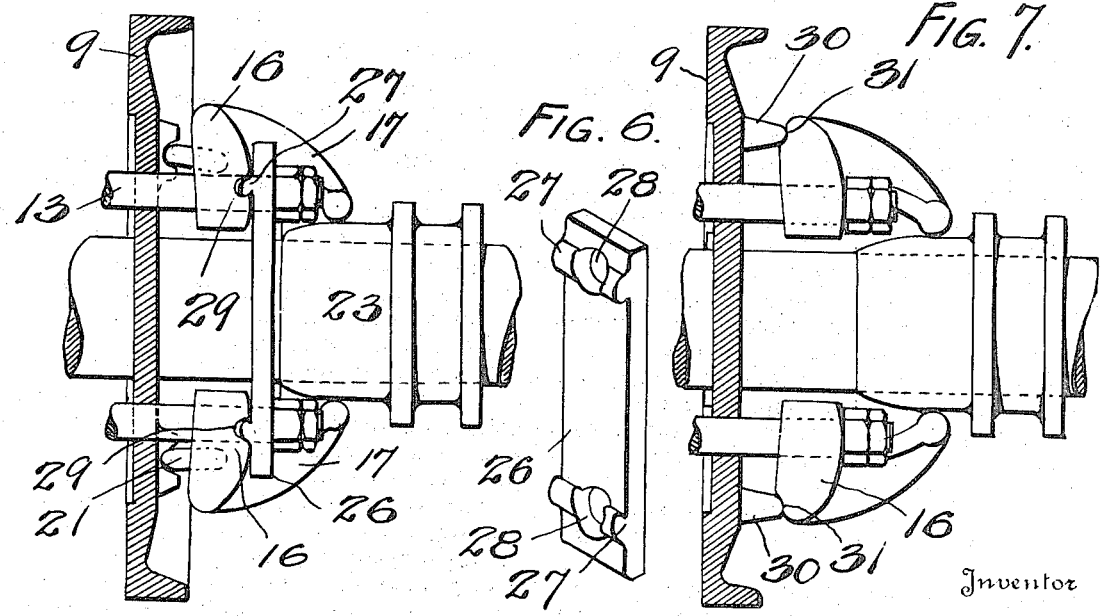

UNITED STATES PATENT OFFICE.

CHARLES O. WOOD, OF CHAMBERSBURG, PENNSYLVANIA.

FRICTION-CLUTCH.

1,282,666.   Specification of Letters Patent.   Patented Oct. 22, 1918.

Application filed December 17, 1917. Serial No. 207,507.

*To all whom it may concern:*

Be it known that I, CHARLES O. WOOD, a citizen of the United States, residing at Chambersburg, in the county of Franklin and State of Pennsylvania, U. S. A., have invented certain new and useful Improvements in Friction-Clutches; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to friction clutches, and has for its object an improved construction of clutch, such as shown in my Patent Number 796,886, dated August 8, 1905, in order to facilitate the assembling of the clutch by eliminating all riveted parts, and in order to enable it to be operated by an ordinary cone. At the same time the locking levers are so made as to counterbalance the centrifugal forces produced at the higher speeds during the rotation of the shaft, and each of these levers is constructed to operate two draw bolts, instead of one as heretofore.

A further object is to enable the clutch to be applied inside of an ordinary belt pulley without having to cut off the hub of this pulley for the application of the clutch. To this end the friction ring or rings is suspended loosely on pins inserted in the arms or spokes of the pulley, so that the ring is in effect a floating ring that will automatically clear the opposing clutch faces when the clutch is in released position.

Other novel details of construction will, hereinafter, be more fully described and particularly pointed out in the claims.

Referring to the accompanying drawings in which like parts are similarly designated—

Figure 1 is a vertical central section, partly in elevation, of a clutch embodying my invention.

Fig. 2 is a detail perspective view of one of the locking levers.

Fig. 3 is a view similar to Fig. 1, showing a modified form of clutch with a single floating friction ring.

Fig. 4 is a modification of Fig. 3, showing two floating friction plates.

Fig. 5 is a detail view showing means for providing fixed and positive load points for the actuating lever.

Fig. 6 is a detail perspective view of a pivot bar for the locking levers.

Fig. 7 shows a modified arrangement of pivots for the locking levers.

Fig. 8 is a detail showing a structure the converse of that shown in Fig. 7.

Fig. 9 is a side elevation partly in longitudinal section embodying the structures shown in Figs. 4, 6 and 7.

Fig. 10 is a transverse section on line 9—9 of Fig. 9.

Referring more particularly to Fig. 1, I have shown my clutch as a cut-off coupling in which the operating elements of the clutch are usually secured to the driving shaft, as 1, and the clutched element as secured to the driven shaft, 2, the two shafts having their abutting ends within the hub 3 of a pulley protecting casing or equivalent 4, whereby said shaft ends are maintained in alinement.

Within the casing 4 is mounted a friction ring 5, arranged to have axial motion by reason of a slot and feather connection 6, 7.

Mounted on the driving shaft 1 is a hub 8 provided with a flange 9 operating as a friction plate and arranged to engage one face of the friction ring 5. This friction ring may be of cast iron, of cast iron with cork or wood inserts, of fiber, of steel plate or of wood.

Said flange or friction plate 9 has on its clutching face a lug 10 projecting within the ring 5, and between spaced lugs 11 on a friction plate 12 engaging the opposite face of the ring 5; or I may reverse this construction and form the lug 10 on the plate 12 and the spaced lugs 11 on the plate 9. These lugs prevent the circular displacement of the friction plates 9 and 12 with respect to one another.

In the friction plate 12 are bolts 13 having spreader springs 14 thereon. These bolts pass through the opposite friction plate 9, and also through holes 15 (Fig. 2) in the laterally projecting arms 16 of two locking levers 17, and are held in these levers by nuts 18 and lock nuts 19. The holes 15 are sufficiently larger than the bolts to allow the arms 16 to rock and assume an angular position with respect to the axes of the bolts. Adjacent the holes 15 in the head of each T-shaped lever 17 are V-shaped recesses 20 into which take short flat toggles 21 whose opposite ends rest in seats 22 on the plate 9.

A cone 23 is provided with a loose split collar 24 having trunnions 25ª to which the shifting lever for the clutch is attached.

In Fig. 3 I have shown a pulley, (or it may be any other wheel, such as a gear wheel,) 4ª loose on the driving shaft 1, and prevented from longitudinally moving on the shaft by a collar, as is customary, and in the arms of this pulley I secure pins 23ª on which the friction ring 5ª is loosely mounted, said friction ring 5ª projecting beyond the edges of the plates 12 and 9 sufficiently for the formation of bosses 24ª through which the pins 23ª pass. The ring 5ª is free to move axially on the pins 23ª, two or more of which will be provided according to the size of the pulley and the power required. In other respects the clutch is of the same structure as that shown in Fig. 1.

In Fig. 4 I have shown two friction rings 5ᵇ mounted on pins 23ª and having suitable inserts of cork or wood a. Between these rings I provide a friction plate 25 carried on the bolts 13, and instead of using a single spring on these bolts 13 I use two springs 14ª, one between the plate 12 and the middle plate 25, and another between the middle plate 25 and the plate 9. Such a construction doubles the friction surface and increases the power of the clutch.

The plates 12 and 25 are carried on the bolts 13 and are free to be moved axially by the springs 14ª when the locking levers 16, 17 are released by the cone 23, and the rings 5ᵇ are free to automatically slide axially on their pins 23ª so as to effectually clear the plates. In other respects the structure is similar to that shown in Fig. 1.

In Fig. 5 I have shown a plate 26 connecting the lateral projections 16 or arms of the head of the T-shaped levers 17 on opposite sides of the shaft. These plates 26 are provided with lugs 27, (Fig. 6) on each side of the holes 28 for the passage of the bolts 13. These lugs are somewhat hook-shaped and seat in recesses 29 in the lateral arms 16 of the locking levers and prevent these levers from wabbling when the cone 23 is applied to cause the clutch to engage, prevent the levers and bolts from spreading when the clutch is engaged, and furnish positive bearing points for the levers, so that the centrifugal forces on these levers will be overcome. It will be noted that the T-heads 16 of the levers 17 contain considerably more metal than their tails, so that the center of mass will lie within the heads. The heads are inclined toward the plate 9, as in Fig. 1, when in clutched position. Should the cone become removed from the tails of the levers 17, the centrifugal force will tend to bring the lugs from their inclined position Fig. 1, to the radial position and thereby release the clutch. When plates 26 are used this is prevented.

The locking levers may directly engage the friction plate 9, thereby omitting the separate toggle levers 21 and facilitating the construction and assemblage of the clutch. This direct engagement of the friction plate may be effected either through the medium of a lug on the plate and a recess or seat in the locking lever, or conversely by a lug on the locking lever and a recess or seat on the plate.

In Fig. 7 I have shown the ends 16 of the locking levers as engaging fixed pivot lugs 30 cast integral with and projecting from the inactive face of the plate 9, the pivot points being shifted nearer to the edge of the plate than is the case when toggles are used, and the ends of the arms 16 are provided with a recess, shoulder, or rabbet 31, seating on the lugs 30 that provide non-movable pivots for the locking levers. These levers may also be provided with plates 26 to prevent the levers and bolts 13 from spreading, as in Fig. 5, and such plates will also prevent the levers 16, 17 from twisting and thereby prevent the shoulders 31 from accidentally slipping off the ends of the lugs 30.

In Fig. 8 I have shown the converse of Fig. 7, where the locking levers 16, 17 are provided with a pivot lug 30ª resting in a recess 31ª in the plate 9 secured to shaft 1.

In these two figures the lugs 30 and 30ª constitute means between the friction plate 9 and the toggle levers 16 whereby these levers are prevented from contacting with the plate.

In Figs. 9 and 10 I have illustrated the structure of Figs. 4, 6 and 7 as combined in the same clutch.

It will be noted that in all the figures of drawings the axially movable friction plate is supported on and by the bolts 13, and the preferred arrangement of the T-shaped locking levers 16, 17, is that in which these levers have direct engagement with the friction plate 9, as shown in Figs. 7 and 8. The number of locking levers 16, 17, is materially reduced, so that in the small clutches it is necessary to use but two of these locking levers which are symmetrically arranged about the axis of the clutch i. e., when two locking levers are used they contact with the cone at diametrically opposite points and operate on four bolts 13.

The T-shaped levers are so constructed that the heads 16 are balanced as nearly as may be by the tails 17, so that at high speeds the centrifugal forces exerted by these two parts of the levers will also be balanced and the clutch will not be thrown out of engagement. It will be noted that the lateral arms of these levers never touch the plate 9 under any condition of operation. This will enable the levers to operate notwithstanding a large amount of wear between the clutching surfaces, and insures pivotal action of the levers at all times.

As will be noticed more particularly in Figs. 5 and 8, the edge of recesses 29 takes under the hook-shaped lugs 27 and pivots at this point of engagement, the centrifugal forces acting on the levers being balanced with respect to this pivot point.

I claim—

1. In a friction clutch, a friction ring, friction plates coöperating with said ring, bolts passing through said plates, locking levers fulcrumed on one of said plates and having lateral arms through which said bolts pass, means engaged by said arms arranged with respect to said levers and fulcrum points to substantially balance the centrifugal force exerted on said levers, and a cone for actuating said levers.

2. In a friction clutch, a friction ring, friction plates coöperating with said ring, bolts passing through said plates, locking levers each having a pair of lateral arms, plates each connecting an arm of one lever with an arm of another lever and having means thereon to prevent said levers from spreading, and forming a positive bearing for said arms, each of said bolts passing through an arm and one end of a plate, and a cone for actuating said levers.

3. In a friction clutch, an axially movable friction plate, T-shaped levers for moving said plate, means between the friction plate and said levers on which they rock, whereby said levers are maintained spaced from said plate under all conditions of operation, bolts passing through said plate and the lateral arms of said levers, springs on said bolts, and a loose cone engaging the tails or said levers for operating them.

4. In a friction clutch, a wheel, pins thereon projecting therefrom, a friction ring free to move axially on said pins, friction plates on opposite sides of said ring, T-shaped locking levers, means between one of said plates and the levers on which they pivot, bolts passing through said plates, the center of said ring and the arms of said locking levers, said arms being out of contact with the coöperating plate under all conditions of operation, springs on said bolts and engaging with their opposite ends said plates, and a cone directly engaging the tails of said locking levers, said springs urging said plates apart and the tails of the levers against the cone.

5. In a friction clutch, a wheel, pins projecting therefrom, a friction ring supported on said pins and free to move axially thereon, friction plates on opposite sides of said ring, T-shaped locking levers having rabbets, a projection on one of said rings engaged by said rabbets, bolts passing through said plates, the center of the ring and the arms of the locking levers, said arms being out of contact with the coöperating plate under all conditions of operation, springs on said bolts whose opposite ends engage the friction plates, and a cone directly engaging the tails of said levers at points nearer the axis of the clutch than said bolts and rabbets.

6. In a friction clutch, a friction plate, levers fulcrumed on the inactive face of said plate and having T-shaped heads, a plate connecting the levers in pairs and in fulcrumed contact with said levers, bolts passing through the friction plate, the heads of the levers and the ends of said connecting plates, and a cone directly engaging the tails of said levers.

In testimony that I claim the foregoing as my invention, I have signed my name in presence of two subscribing witnesses.

CHARLES O. WOOD.

Witnesses:
 Geo. M. Naylor,
 G. H. Wood.